United States Patent [19]
Saito

[11] Patent Number: 5,635,263
[45] Date of Patent: Jun. 3, 1997

[54] REINFORCING FIBER SHEET AND CONCRETE STRUCTURE USING SAME

[75] Inventor: Makoto Saito, Saitama-ken, Japan

[73] Assignee: Tonen Corporation, Tokyo, Japan

[21] Appl. No.: 310,544

[22] Filed: Sep. 22, 1994

[30] Foreign Application Priority Data

Sep. 28, 1993 [JP] Japan .................... 5-263027

[51] Int. Cl.$^6$ .................................................. B32B 5/24
[52] U.S. Cl. .................. 428/40.1; 52/309.16; 52/309.17; 52/649.1; 52/664; 428/113; 428/114; 428/212; 428/217; 428/220; 428/703; 428/902; 442/42; 442/386
[58] Field of Search .................... 428/114, 113, 428/217, 220, 212, 245, 261, 262, 288, 294, 408, 703, 902, 40.1; 52/309.16, 309.17, 649.1, 664

[56] References Cited

U.S. PATENT DOCUMENTS

| 4,316,925 | 2/1982 | Delmonte | 428/109 |
|---|---|---|---|
| 4,443,507 | 4/1984 | Yamada et al. | 428/114 |
| 4,603,157 | 7/1986 | Asai et al. | 523/440 |

FOREIGN PATENT DOCUMENTS

| 0 441 519 | 8/1991 | European Pat. Off. . |
|---|---|---|
| 0 572 243 | 12/1993 | European Pat. Off. . |
| 2 447 274 | 8/1980 | France . |
| 2 594 871 | 8/1987 | France . |
| 1197532 | 8/1989 | Japan . |
| 1 522 039 | 8/1978 | United Kingdom . |

OTHER PUBLICATIONS

Derwent Publications Ltd., Database WPI Week 9131, AN 91-227208 and JP-A-3 146 717 (Tonen Corp.) 21 Jun. 1991.

Derwent Publications Ltd., Database WPI Week 8412, AN 84-071954 and JP-A-59 026 563 (Nitto Boseki) 10 Feb. 1984.

*Primary Examiner*—Nasser Ahmad
*Attorney, Agent, or Firm*—Seidel, Gonda, Lavorgna & Monaco, PC

[57] ABSTRACT

The present invention has an object to provide a reinforcing fiber sheet which permits sufficient reinforcement of a concrete structure with a smaller number of layers than in the conventional cases, without causing fracture of the sheet within a range of yielding of reinforcing bars. The reinforcing fiber sheet 1 of the invention comprises high-elasticity and high-elongation carbon fibers 4 having a modulus of elasticity of at least 35 ton/mm$^2$ and a fracture elongation of at least 0.9%, arranged in an amount of at least 250 g/m$^2$ in one direction through an adhesive layer 3 on a substrate sheet 2. The object of the invention can be achieved by providing the carbon fibers 4 of the reinforcing fiber sheet 1 with the above-mentioned properties.

17 Claims, 3 Drawing Sheets

REINFORCING FIBER SHEET AND CONCRETE STRUCTURE USING SAME

BACKGROUND OF THE INVENTION

1. Field of the Invention

The present invention relates to a reinforcing fiber material used for reinforcing a concrete structure by sticking same on the concrete structure and impregnating the fiber with a resin, particularly a reinforcing fiber sheet prepared by arranging carbon fiber on a substrate sheet in one direction, and a concrete structure having a reinforcing layer of a fiber-reinforced composite material using such a reinforcing fiber sheet on the surface thereof.

2. Prior Art

It is conventionally the usual practice to reinforce or repair a concrete structure, such as a pier of a bridge for automobiles or railway, or a beam or a column of a building, with a fiber-reinforced composite material.

Conventional reinforcement has usually been to use a fiber-reinforced composite material prepared by sticking a prepreg to the surface of a concrete structure and curing the prepreg.

However, the prepreg has had troublesome storage so as not to cause curing, and difficulties in execution including difficult cutting into desired size and shape at the reinforcing site.

The present applicant developed therefore a reinforcing fiber sheet as a reinforcing material permitting reinforcement with a fiber-reinforced composite material by easily applying onto the surface of a concrete structure without the need for troublesome storage as in a prepreg, and proposed the reinforcing fiber sheet and a method of reinforcement with the use thereof (Japanese Patent Application Laid Open Nos. 3-222,734, 3-224,901, etc.).

The proposed reinforcing fiber sheet as described above comprises reinforcing fibers arranged, for example, in one orientation through an adhesive layer on a substrate sheet, and is to reinforce a concrete structure by sticking the reinforcing sheet onto the surface of a portion to be reinforced of the concrete structure, and curing a resin impregnated into the fiber before or after sticking to convert the reinforcing fiber sheet into a fiber-reinforced composite material.

According to this reinforcing fiber sheet, excellent effects are available, including absence of storage problems as in a prepreg, simple handling at a reinforcing site, and easy execution on the surface of a concrete structure.

Since a reinforcing bar arranged in a concrete structure yields with a strain of only about 0.15 to 0.20%, in the case where the concrete structure is continuously loaded it is necessary to reinforce the concrete structure within the range of this strain in the reinforcing bar.

For this purpose, it is the conventional practice to use a carbon fiber sheet having a modulus of elasticity of the 23.5 ton/mm² class and a reinforcing weight of about 200 g/m² in reinforcement with the use of a unidirectional carbon fiber sheet (a reinforcing fiber sheet having carbon fibers arranged in one direction). This carbon fiber sheet has such a low toughness per layer that it is necessary to laminate multiple layers of carbon fiber sheets on the portion to be reinforced in order to achieve reinforcement within the range of strain of from about 0.15 to 0.20%, thus resulting in a longer period for construction and a higher construction cost.

SUMMARY OF THE INVENTION

An object of the present invention is to provide a reinforcing fiber sheet which permits sufficient reinforcement of a concrete structure with a smaller number of layers than in the conventional cases, within a range of yielding of a reinforcing bar, without causing breakage of the sheet, and a concrete structure having reinforcing layers of a fiber-reinforced composite material using this reinforcing fiber sheet formed on the surface thereof.

The above-mentioned object is achieved with the reinforcing fiber sheet and the concrete structure of the present invention. In summary, the present invention provides a reinforcing fiber sheet which comprises high-elasticity and high-elongation carbon fibers having a modulus of elasticity of at least 35 ton/mm² and a fracture elongation of at least 0.9% arranged in one direction to give a fiber weight of at least 250 g/m² through an adhesive layer onto a substrate sheet.

The present invention provides also a concrete structure wherein the reinforcing fiber sheet as described above is applied to the surface of the reinforced concrete with reinforcing bars in such a manner that the direction of the reinforcing fibers are arranged in the same direction as that of the reinforcing bars, curing a resin impregnated into the above-mentioned reinforcing fiber before and/or after sticking, and thus forming reinforcing layers of the resultant fiber-reinforced composite material on the surface thereof.

In the present invention, by using a reinforcing fiber sheet of carbon fiber of the above-mentioned properties (carbon fiber sheet), there is available a toughness per sheet of at least 2.5 times as high as that in the conventional carbon fiber sheet. It is therefore possible to largely reduce the number of layers of carbon fiber sheets and simplify the laminating process.

In the present invention, the reasons using of high-elongation carbon fiber which has a high fracture elongation of at least 0.9% in spite of having high elasticity for the carbon fiber sheet are as follows.

Concrete is generally believed to have a tensile fracture elongation of about 0.03%: cracks therefore already occur near 0.15% at which a reinforcing bar yields. Because portions around cracks is subjected to a local stress, medium-quality sheets having a fracture elongation of under 0.9% may fracture prior to yielding of the reinforcing bar. Even in reinforcement within the range of strain from about 0.15 to 0.2% of yielding of a reinforcing bar, therefore, sheets should have a high fracture elongation of at least 9%.

Now, the present invention is described below further in detail by means of some embodiments.

DETAILED DESCRIPTION OF THE PREFERRED EMBODIMENTS

Figure 1:
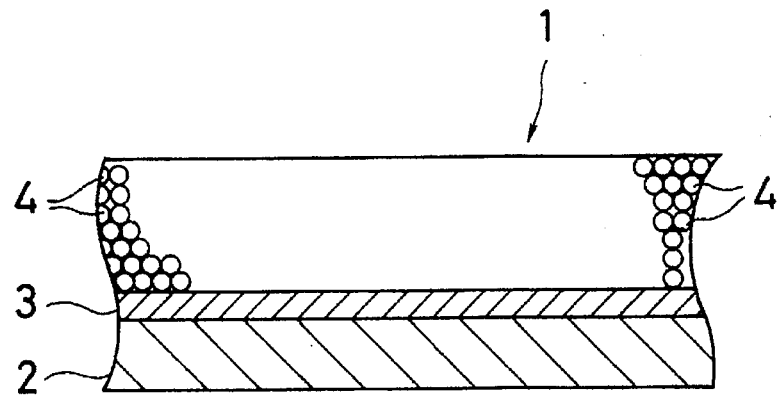
FIG. 1 is a cross-sectional view illustrating an embodiment of the reinforcing fiber sheet of the present invention.

FIG. 1 is a cross-sectional view illustrating an embodiment of the reinforcing fiber sheet of the present invention.

The reinforcing fiber sheet 1 comprises, as in the conventional one, carbon fibers 4 arranged as reinforcing fibers in one direction through an adhesive layer 3 on a substrate sheet 2. A plurality of such sheets 1 are stuck onto the surface of a portion to be reinforced of a concrete structure into a desired number of layers, the carbon fibers 4 are impregnated with a resin before and/or after sticking, and then the resin is cured to convert the resin-impregnated sheets 1 into a fiber-reinforced composite material, whereby the concrete structure is reinforced by means of the reinforcing layer of the fiber-reinforced composite material.

According to the present invention, the above-mentioned carbon fiber 4 should be a high-elongation one having a modulus of elasticity of at least 35 ton/mm$^2$, preferably at least 40 ton/mm$^4$, and a fracture elongation of at least 0.9%, preferably at least 1.1% and the weight of fiber layers on the substrate sheet 2 should be at least 250 g/m$^2$.

With a modulus of elasticity of the carbon fiber of under 35 ton/mm$^2$, the reinforcing fiber sheets 1 in one or more layers can not sufficiently reinforce the concrete structure within the range of yielding of the reinforcing bars arranged in the reinforced concrete (strain of the order of from 0.15 to 0.2%), and it is therefore necessary to provide multiple layers of the reinforcing fiber sheets 1.

With a fracture elongation of the carbon fiber 4 of under 0.9%, the carbon fibers 4 do not sufficiently follow cracks of concrete, and the reinforcing fiber sheet 1 fractures before yielding of the reinforcing bar, thus resulting in impossibility to fully utilize the reinforcing effect.

A weight of carbon fibers 4 of under 250 g/m$^2$ is too small to achieve a sufficient reinforcement within the yielding range of reinforcing bar of the concrete structure, leading to the necessity of forming the reinforcing fiber sheets 1 into multiple layers.

As for the substrate sheet 2 of the reinforcing fiber sheet 1, there may be used scrim cloth, glass cloth, mold release paper, nylon film and the like. When scrim cloth or glass cloth is used for the substrate sheet 2, the thermosetting resin can be impregnated from the side of the sheet 2 into the carbon fibers 4. To keep a level of flexibility and to permit support of the carbon fibers 4, the substrate sheet 2 should have a thickness within a range of from 1 to 500 μm, or more preferably, from 5 to 100 μm.

Any adhesive which can at least temporarily stick the carbon fibers 4 onto the substrate sheet 2 may in principle be used for forming the adhesive layer 3. It is preferable to use a resin having a satisfactory affinity with a thermosetting resin: when an epoxy resin is used as the thermosetting resin, for example, it is recommended to use an epoxy type adhesive. Because the adhesive has to bond the carbon fibers 4 only temporarily, the thickness of the adhesive layer 3 should be within a range of from 1 to 500 μm, or more preferably, from 10 to 30 μm.

The carbon fibers 4 arranged in one direction of the reinforcing fiber sheet 1 are provided on the substrate sheet 2 by unidirectionally arranging fiber bundles each binding a plurality of filaments or bundles gathering slightly twisted filaments through the adhesive layer 3 onto the substrate sheet 2 and pressing them from above. Pressing of the fiber bundles slightly scatters the fiber bundles and the filaments thereof are stuck in one direction through the adhesive layer 3 onto the substrate sheet 2 in a state in which the filaments are laminated into a plurality of layers through connection by a bundling agent or twisting, thus giving the desired reinforcing fiber sheet 1.

At this point of the process, fiber bundles may be densely arranged close to each other or may be sparsely arranged at intervals. The filaments of a fiber bundle may or may not be opened. The degree of pressing depends upon the target thickness of the arranged reinforcing fibers 4. As an example, carbon fiber bundles each containing about 12,000 filaments of a diameter of from 5 to 15 μm should be pressed to cause the filaments to form a width of about 5 mm.

Applicable resins for impregnation of the carbon fibers 4 include epoxy, unsaturated polyester, vinyl ester and urethane thermosetting resins. Particularly, a room-temperature setting type resin made to set at the room temperature by adjusting the curing agent and/or the curing accelerator for the thermosetting resin is suitably applicable. When using an ordinary thermosetting resin, it is necessary to cure the thermosetting resin impregnated into the reinforcing fibers through heating of the reinforcing fiber sheet after applying the resin-impregnated reinforcing fiber sheet onto the surface of a concrete structure. It is however possible, when using a room-temperature setting resin, to cause curing of the thermosetting resin by leaving the reinforcing fiber sheets laminated on the surface of the concrete structure after impregnation of reinforcing fibers with the resin, thus permitting efficient reinforcement of the concrete structure.

Impregnation of the carbon fibers 4 with a thermosetting resin may be conducted before and/or after sticking the reinforcing fiber sheets 1 onto the surface of the concrete structure. When the thermosetting resin is impregnated after sticking, a resin-permeable sheet such as scrim cloth or glass cloth may be used as the substrate sheet 2 of the reinforcing fiber sheet 1, as described above.

Reinforcing using the reinforcing fiber sheet 1 of the present invention is described below with a concrete beam as an example.

Figure 2:
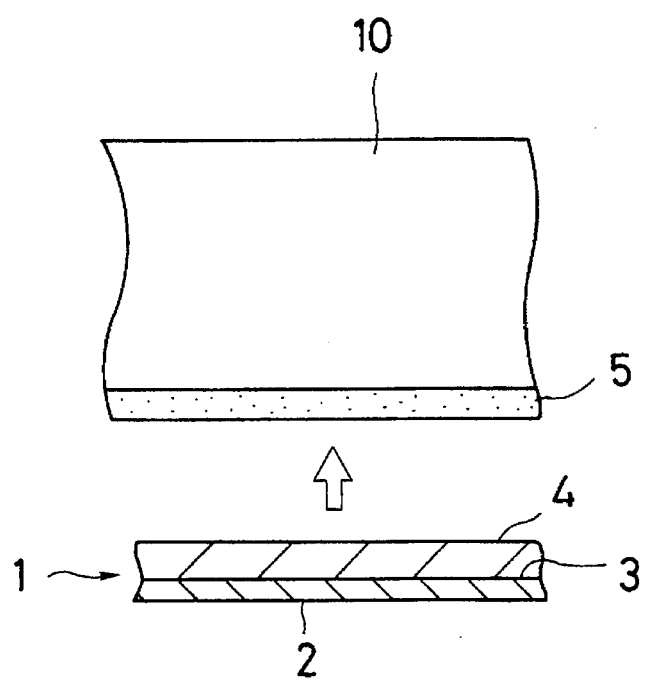
FIG. 2 is a sectional view illustrating a typical reinforcing method of a concrete beam using the reinforcing fiber sheet shown in FIG. 1.

As shown in FIG. 2, this operation comprises the steps of applying a thermosetting resin 5 onto the surface of the portion to be reinforced of a beam 10 into a thickness of, for example, about 100 μm, then sticking one or more reinforcing fiber sheets 1 by aligning the direction of the carbon fibers 4 with the longitudinal direction of the beam 10, and impregnating the carbon fibers 4 with the thermosetting resin 5 by pressing. When sticking the second sheet 1 onto the already stuck sheet 1, the thermosetting resin may be applied again onto the substrate sheet 2 of the first sheet 1. Then, after impregnating operation of the thermosetting resin by means of a hand roller, for example, the reinforcing fiber sheet 1 is heated, or when using a room-temperature setting type thermosetting resin, the reinforcing fiber sheet 1 is left as it is to cure the thermosetting resin having been impregnated into the carbon fibers 4, thus converting the reinforcing fiber sheet 1 into a fiber-reinforced composite material. The concrete beam 10 is thus reinforced with the fiber-reinforced composite material.

Figure 3:
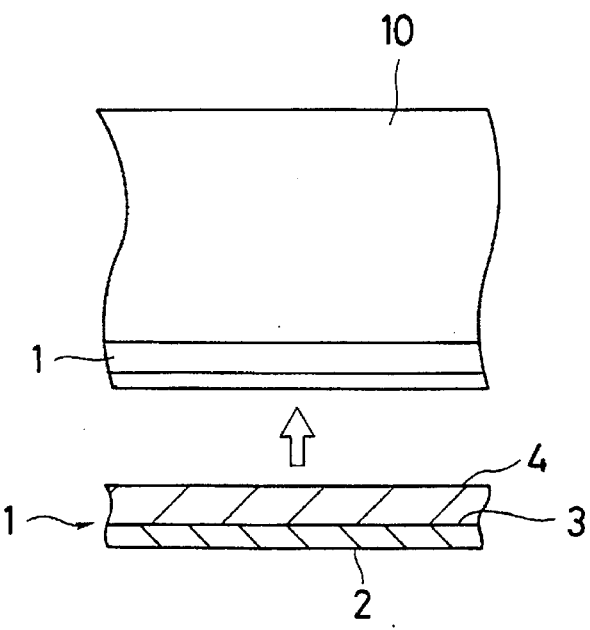
FIG. 3 is a sectional view illustrating another reinforcing method.

An alternative practice comprises the steps of applying, for impregnation, the thermosetting resin onto the carbon fibers 4 on the reinforcing fiber sheet 1 with the use of an appropriate means such as a roller, a brush or spraying, and then as shown in FIG. 3, sticking one or more reinforcing fiber sheets 1 onto the surface of the portion to be reinforced of the concrete beam 10 with the carbon fibers 4 on the beam 10 side while considering the direction of the carbon fibers 4. The subsequent operation is only to cure the thermosetting resin to convert the sheet 1 into a fiber-reinforced composite material in the same manner as that described above.

Figure 4:
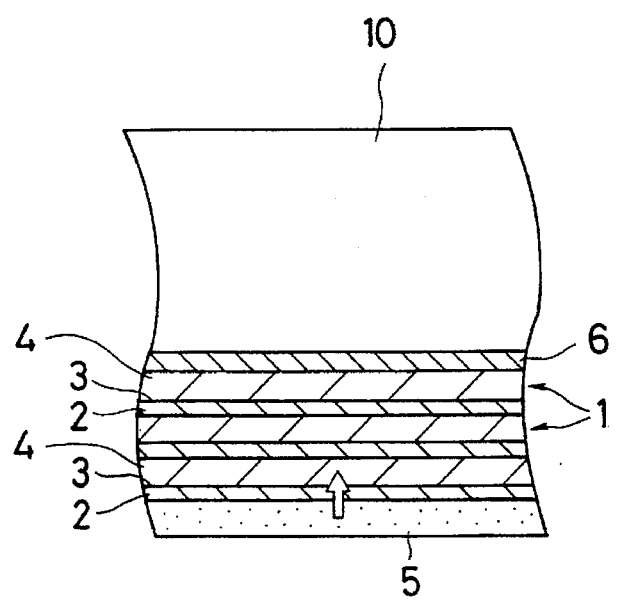
FIG. 4 is a sectional view illustrating further another reinforcing method.

Another alternative practice comprises the steps of using a reinforcing fiber sheet 1 having a resin-permeable substrate sheet 2, applying, as the primer 6, a resin of the same type as the thermosetting resin onto the surface of the portion to be reinforced of the concrete beam 10, as shown in FIG. 4, sticking one or more reinforcing fiber sheets 1 thereonto while considering the orientation of the carbon fibers 4, and then causing impregnation of the thermosetting resin 5 onto the substrate sheet 2 of the outermost sheet 1 by means of a roller, for example. The subsequent operation is only to cure the thermosetting resin to convert the sheet 1 into a fiber-reinforced composite material in the same manner as above.

In all of the above-mentioned embodiments, the reinforcing fiber sheet 1 has been stuck with the carbon fibers 4 directed toward the concrete beam 10. It is however possible also to accomplish sticking with the substrate sheet 2 directed toward the beam 10.

Now, the present invention is described below by means of some examples.

EXAMPLES

Example 1 and Comparative Examples 1 to 4:

Concrete beams were reinforced by using various unidirectional carbon fiber sheets in accordance with the present invention. Reinforcement tests were carried out on the reinforced concrete beams based upon the four-point bending tests.

Figure 5C:
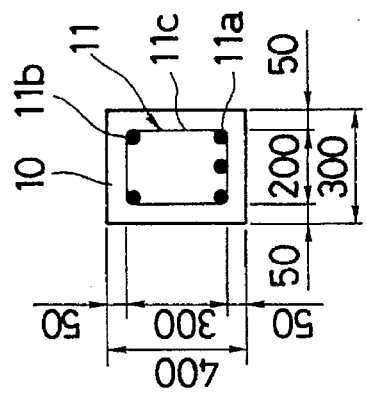
FIGS. 5(a), 5(b) and 5(c) shows descriptive views of a test for investigating the reinforcing effect of a concrete beam using the reinforcing fiber sheet of the present invention.
Figure 5A:
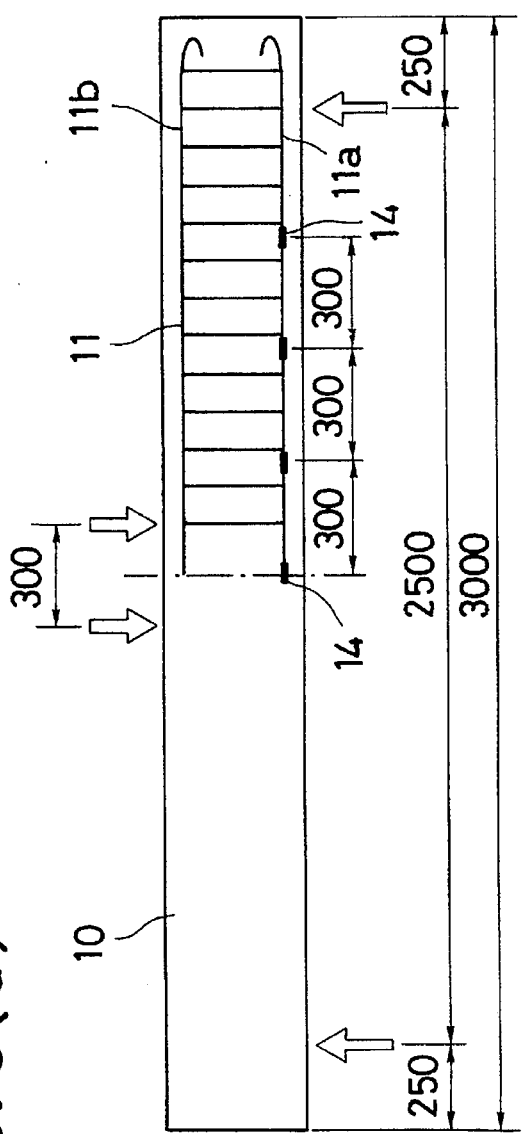
Figure 5B:
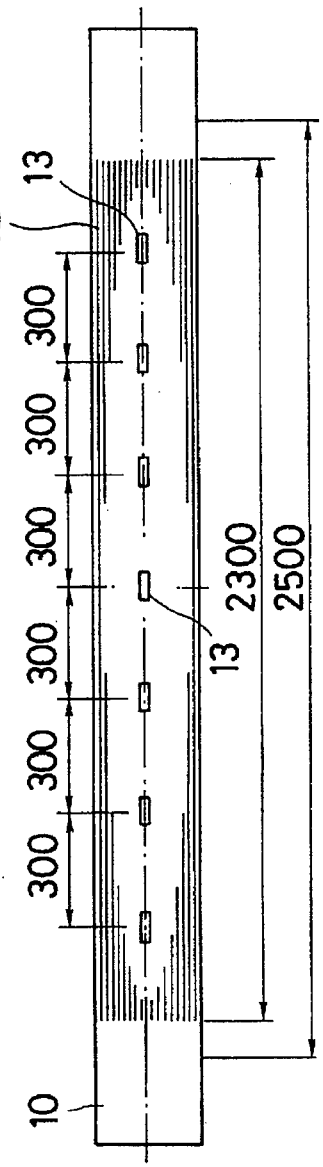

The tested concrete beam had a width of 300 mm, a height of 400 mm, and a length of 3,000 mm, and contains, as shown in FIG. 5, a reinforcing bar frame 11 therein arranged in the longitudinal direction. The reinforcing bar frame 11 is formed, as shown in the longitudinal and cross-sectional views given in FIGS. 5(a) and (c), with two reinforcing bars (D-13-2) 11b having a diameter of 13 mm arranged in the upper part and three reinforcing bars (D-13-3) 11b having a diameter of 13 mm in the lower part, these reinforcing bars 11a and 11b being connected into frame shapes with reinforcing bars 11c having a diameter of 8 mm at a plurality of positions along the longitudinal direction.

Reinforcing fiber sheets 1 shown in FIG. 1 were stuck over the range of a length of 2,300 mm of the concrete beam 10 except for the both end portions of the lower surface thereof with the direction of carbon fibers 4 aligned with the longitudinal direction of the beam 10, impregnated with a thermosetting resin, cured, and formed into a reinforcing layer 12 of a fiber-reinforced composite material.

The executing procedure of the reinforcing layer 12 comprises the steps of sanding the lower surface of the concrete beam, providing a primer to the surface, then applying the thermosetting resin in an amount of about 500 g/m$^2$ to the surface, sticking a reinforcing fiber sheet 1 to the surface, replenishing the resin from above, and impregnating the resin into the fiber sheet 1 by means of a hand roller. The resin was cured by leaving the product at the room temperature for seven days.

FP Primer manufactured by Tonen Co., Ltd. (FP-S; an epoxy resin) was used for providing the above-mentioned primer, and FR Resin manufactured by Tonen (FR-E3P; an epoxy resin adhesive) was used as the thermosetting resin.

After curing, the lower surface of the beam 10 provided with the reinforcing layer 12 is supported at positions spaced apart by 250 mm from the both ends thereof, and a load was applied at two points spaced apart by 300 mm from each other at the center of the beam 10 to conduct four-point bending of the beam 10. As shown in the lower surface view of FIG. 5(b), seven strain gauges 13 were attached at intervals of 300 mm along the longitudinal direction at the width center of the lower surface of the beam 10 to measure strain of the reinforcing fiber sheet 1. Reinforcing bar strain gauges 14 were attached at positions corresponding to the above-mentioned strain gauges 13 to the reinforcing bar frame 11 in the beam 10 to measure strain of the reinforcing bars.

Specifications for the reinforcing fiber sheets used are shown in Table 1, and the results obtained, in Table 2.

TABLE 1

Specifications for reinforcing fiber sheets

| | Type of carbon fiber | Strength of fiber kgf/mm$^2$ | Modulus of elasticity of fiber tons/mm$^2$ | Fracture elongation % | Fiber weight g/m$^2$ |
|---|---|---|---|---|---|
| Example 1 | Mitsubishi Rayon/ HR40 | 450 | 40 | 1.1 | 300 |
| Comparative Example 1 | Not reinforced | — | — | — | — |
| Comparative Example 2 | Toray/ T700) | 500 | 23.5 | 2.0 | 300 |
| Comparative Example 3 | Mitsubishi Rayon/ HR40 | 450 | 40 | 1.1 | 200 |
| Comparative Example 4 | Toray/M40 | 300 | 40 | 0.7 | 300 |

TABLE 2

| | Load upon yielding of reinforcing (tons) | Maximum load (tons) | Fracture of beam or sheet under max. load |
|---|---|---|---|
| Example 1 | 13.0 | 17.2 | Sheet peeled off |
| Comparative Example 1 | 9.2 | 9.5 | Fractured |
| Comparative Example 2 | 9.0 | 13.2 | Sheet peeled off |
| Comparative Example 3 | 9.5 | 14.2 | Sheet peeled off |
| Comparative Example 4 | 12.0 | — | Sheet fractured before yielding of reinforcing bar |

In the Example 1, as shown in Table 2, unidirectional carbon fiber sheets having a modulus of elasticity of at least 40 ton/mm$^2$, and a fracture elongation of 1.1% were used in an amount of 300 g/m$^2$ as the carbon fiber sheets 1 of the reinforcing layers 12. The load upon yielding of the reinforcing bar therefore increased to 13 tons, thus exhibiting a sufficient reinforcing effect. The load was further increased far beyond the level of yielding of the reinforcing bar: at the point with a strain of the reinforcing fiber sheet of about 0.55% and under a load of 17.2 tons, the sheet was peeled off and the beam 10 was finally fractured.

In the Comparative Example 1 in which no reinforcement was provided, in contrast, the reinforcing bars yielded under a load of 9.2 tons, and the reinforcing bars elongated under the load held on the same level thereafter until fracture of the beam 10. In the Comparative Example 2 in which a reinforcing fiber sheet uses carbon fibers having a modulus of elasticity of 23.5 ton/mm$^2$, the reinforcing bars yielded under a load of 9.0 tons, suggesting that almost no reinforcing effect was available. As the load was increased further, the sheet was peeled off the beam 10 and the beam 10 was broken in this state at a point with a strain of the reinforcing fiber sheet of about 0.55% under a load of 13.2 tons. This example represents a case where an increase in yield strength was observed only after yielding of the reinforcing bars, so that this practice is not suitable for reinforcing against a load constantly applied. The Comparative Example 3 using a reinforcing fiber sheet which has carbon fibers in an amount of 200 g/m² showed a tendency substantially identical with that in the Comparative Example 2: with a strain of the reinforcing fiber sheet of about 0.55% under a load of 14.2 tons, the beam 10 was fractured as a result of peeling of the sheet from the beam 10. elongation of carbon fibers of the reinforcing fiber sheet is lower than the range in the present invention (at least 0.9%), prior to yielding of the reinforcing bars, the sheet was fractured with a strain of the reinforcing fiber sheet of about 0.18% under a load of 12.0 tons, and the beam 10 was broken. The position of fracture of the sheet was the same as the position of cracks occurring in the beam 10. At the strain measuring point, the sheet had a strain of 0.18% with which fracture would not have been caused. It is estimated that stress was considered to have acted locally at the cracked portion, and exceeded the fracture elongation of the carbon fibers to cause the fracture of the sheet.

The reinforcing fiber sheet of the present invention comprises, as described above, high-elasticity and high-elongation carbon fibers having a modulus of elasticity of at least 35 ton/mm² and a fracture elongation of at least 0.9%, arranged in an amount of at least 250 g/m² in one direction through an adhesive layer on a substrate sheet. It is therefore possible to provide a sufficient reinforcement of a concrete structure without causing fracture of sheets within a yielding range of reinforcing bars with a smaller number of laminated layers than in the conventional case, and to fully utilize the reinforcing effect through elongation following cracks occurring in concrete.

What is claimed is:

1. A concrete structure which is formed by adhering a single layer of reinforcing fiber sheet which comprises a substrate sheet and high-elasticity and high-elongation carbon fibers arranged in one direction on the substrate sheet through an adhesive layer, to a surface of a concrete structure having reinforcing bars by aligning the orientation of the carbon fibers with the direction of the reinforcing bars of the concrete structure, and then curing a thermosetting resin impregnated into the carbon fibers, thereby forming reinforcing layer of a fiber-reinforced composite material, wherein the carbon fibers have a modulus of elasticity of at least 35 ton/mm² and a fracture elongation of at least 0.9%, and the reinforcing fiber sheet has the carbon fibers in an amount of at least 250 g/m².

2. A concrete structure as claimed in claim 1, wherein said carbon fibers have a modulus of elasticity of 40 ton/mm² and a fracture elongation of 1.1%.

3. A concrete structure as claimed in claim 1, wherein said substrate sheet is selected from the group consisting of scrim cloth, glass cloth, mold release paper and a nylon film.

4. A concrete structure as claimed in claim 1, wherein said substrate sheet has a thickness within a range of from 1 to 500 µm.

5. A concrete structure as claimed in claim 1, wherein said thermosetting resin is selected from the group consisting of an epoxy, unsaturated polyester, vinyl ester and urethane resin.

6. A concrete structure as claimed in claim 2, wherein said substrate sheet is selected from the group consisting of scrim cloth, glass cloth, mold release paper and a nylon film.

7. A concrete structure as claimed in claim 2, wherein said substrate sheet has a thickness within a range of from 1 to 500 µm.

8. A concrete structure as claimed in claim 3, wherein said substrate sheet has a thickness within a range of from 1 to 500 µm.

9. A concrete structure as claimed in claim 2, wherein said thermosetting resin is selected from the group consisting of an epoxy, unsaturated polyester, vinyl ester and urethane resin.

10. A concrete structure as claimed in claim 3, wherein said thermosetting resin is selected from the group consisting of an epoxy, unsaturated polyester, vinyl ester and urethane resin.

11. A concrete structure as claimed in claim 4, wherein said thermosetting resin is selected from the group consisting of an epoxy, unsaturated polyester, vinyl ester and urethane resin.

12. A concrete structure as claimed in claim 1, wherein the impregnation of a thermosetting resin into the carbon fibers is conducted (1) by coating the resin to the reinforcing fiber sheet before adhering the sheet to the surface of the concrete structure, (2) by coating the resin to the reinforcing fiber sheet after adhering the sheet to the surface of the concrete structure, or (3) by coating the resin to the surface of the concrete structure and adhering to press the reinforcing fibers sheet to the resin coated surface.

13. A reinforced concrete structure comprising:

a concrete structure having reinforcing bars and a single layer of reinforcing fiber sheet comprising a substrate sheet, an adhesive layer, and a plurality of carbon fibers having a modulus of elasticity of at least 35 ton/mm², a fracture elongation of at least 0.9%, and a unit weight on the fiber sheet of at least 250 g/m², the reinforced fiber sheet being adhered to the concrete structure with the plurality of carbon fibers aligned in the direction of the reinforcing bars of the concrete structure, a thermosetting resin being impregnated into the plurality of carbon fibers and allowed to cure thereon.

14. A reinforced concrete structure as claimed in claim 13, wherein the thermosetting resin is impregnated into the carbon fibers by coating the substrate sheet before adhering the sheet to the surface of a concrete structure.

15. A reinforced concrete structure as claimed in claim 13, wherein the thermosetting resin is impregnated into the carbon fibers by coating the resin to the substrate sheet after adhering the sheet to a surface of the concrete structure.

16. A reinforced concrete structure as claimed in claim 13, wherein the thermosetting resin is impregnated into the carbon fibers by coating a surface of the concrete structure prior to adhering the carbon fibers and substrate sheet to the resin coated surface.

17. A concrete structure as claimed in claim 4, wherein said substrate sheet has a thickness within a range of from 5 to 100 µm.

* * * * *